2,713,173
FLUSH VALVE

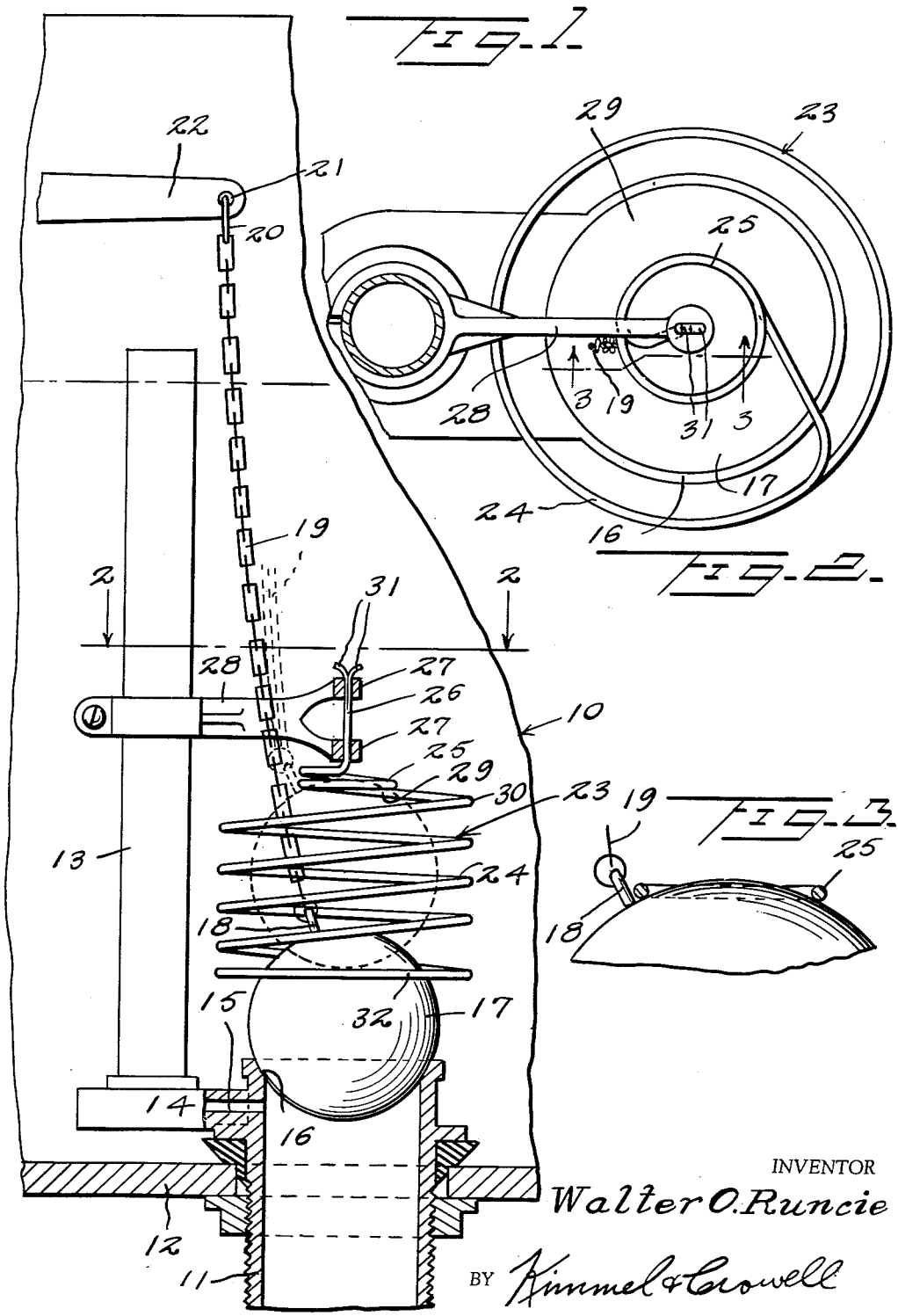

Walter O. Runcie, Lima, Peru

Application March 31, 1953, Serial No. 345,812

2 Claims. (Cl. 4—57)

This invention relates to valves for flush tanks.

An object of this invention is to provide an improved valve for flush tanks wherein the valve plug or tank ball is of spherical construction and is secured to the trip lever by means of a flexible connector. In association with the improved valve assembly, an improved guide is provided which will eliminate the usual sticking of the plug such as occurs with the conventional type of plug having a rigid stem affixed thereto.

Another object of this invention is to provide an improved ball valve and guide wherein the valve plug or ball is limited in its lateral movement so that the plug will always be held in a position to promptly engage on the valve seat when the tank reaches its empty condition.

Another object of this invention is to provide a simple coiled wire guide of helical form, the integral stem of which is readily attached and secured to the vertical sleeve of the usual guide arm found in conventional flush tanks.

Another object of this invention is to provide means that will effectively prevent snagging of the flexible connector.

Another object of this invention is to provide for instant collocation or removal of the valve plug, without having to remove the helical guide from its pendant position on the conventional guide arm.

Still another object of this invention is to provide for single-point attachment of the helical guide, the lower free end of which is concentric with and substantially spaced from the valve seat. Inherent resiliency of the helical guide permits of easy insertion or removal of the valve plug, but effectively prevents escape of the plug during normal operation.

With the above and other objects in view, my invention consists in the arrangement, combination and details of construction disclosed in the drawings and specifications and then more particularly pointed out in the appended claims.

In the drawing:

Figure 1 is a fragmentary vertical section of a flush tank having disposed therein a flush valve constructed according to an embodiment of this invention.

Figure 2 is a sectional view taken on the line 2—2 of Figure 1.

Figure 3 is a sectional view taken on the line 3—3 of of Figure 2.

Referring to the drawing, the numeral 10 designates generally a conventional flush tank having an outlet nipple 11 mounted in the bottom wall 12 thereof. A vertically disposed overflow pipe 13 is carried by and extends upwardly from the nipple 11 being mounted in an offset connection 14 having a passage 15 opening into the nipple 11 below the valve seat 16. A spherical valve plug or member 17 is adapted to engage on the seat 16 and valve plug 17 is preferably formed of rubber or similar material and is of hollow construction so as to be relatively buoyant. The plug 17 is formed with a lug 18 with which is connected the lower end of a non-kinking corrosion-resistant chain or flexible member 19. The upper end of the chain or flexible member 19 is provided with a hook 20 engaging through an opening 21 formed in the trip lever 22.

A guide generally designated 23 is mounted within the tank 10 and comprises a corrosion-resistant coiled wire helical member or cage 24, on the upper end of which is formed integrally a small diameter annular anti-snag guard 25 for the chain or flexible member 19 and terminating in a slitted upstanding stem 26 for attachment to the vertically disposed sleeve 27 of the conventional guide arm 28 attached to the overflow pipe 13 of the flush tank 10. The helical member or cage 24, anti-snag chain guard 25 and slitted upstanding stem 26 together form a unit wound from a single length of corrosion-resistant wire of suitable guage, number eight being satisfactory. This unit is mounted on the conventional guide arm 28 in such a manner that it is pendant from said arm and in coaxial disposition relative to the axis of the valve seat 16. The chain or flexible member 19 engages loosely through the annular space 29 formed between the upper-most convolution 30 of the helical guide 24 and the annular anti-snag chain guard 25 and preferably the chain or flexible member 19 is of such length that when the valve plug 17 is seated on the seat 16, there will be a slight amount of slack in the chain 19 between the plug 17 and the trip lever 22.

The helical guide 23 is attached to the conventional guide arm 28 affixed to the overflow pipe 13 of the flush tank 10 by inserting the upstanding slitted stem 26 of the guide upwardly through the vertically disposed sleeve 27 of the conventional guide arm 28 and flaring the legs 31—31 outwardly in opposite directions by means of a small screwdriver, knife or other simple tool. This forms a secure attachment and one-point suspension for the helical guide 23, said guide being open at its lower end, axially disposed and substantially spaced above the valve seat 16. Immediately below the upstanding slitted stem 26 and integral therewith, is located the annular anti-snag chain guard 25, this latter in association with the conventional guide arm 28 functions as a limiting step for the valve plug 17 when pulled upwardly to an open position and also effectively prevents snagging of the chain or flexible member 19.

In the use and operation of this structure, the helical guide 23 is mounted on the conventional guide arm 28 as previously explained and the chain or flexible member 19 is extended upwardly through the interior of the helical guide, then through the annular space 29 formed between the uppermost convolution 30 of the helical guide 24 and the annular anti-snag chain guard 25 and then finally connected by means of the connecting member or hook 20 to trip lever 22. During the insertion of the chain or flexible member 19, the lower end of the helical guide 23 is raised upwardly sufficiently to permit entrance of the valve plug 17 to its proper position on the valve seat 16. Inherent resiliency of the helical guide 23 permits easy insertion of the valve plug 17 by contracting the guide 23 without the necessity of having to remove the helical guide from the conventional guide arm 28. Valve replacement when necessary is as easily accomplished. The spacing between the lowest convolution 32 of the helical guide 23 and the valve seat 16 is not critical, it being made narrow enough to prevent escape of the valve plug 17 during normal use. The loose connection between the valve plug 17 and the trip lever 22 will permit the valve plug 17 to adjust itself automatically on the seat 16 and permit the lug 18 to be positioned out of the vertical plane of the axial center of the valve seat 16, as shown in Figure 1. This self adjusting feature of the valve plug will eliminate any ridges being formed on the lower portion of the valve plug after the same has been in use for a substantial period of time.

From the foregoing, the construction and operation of the device will be readily understood and further explanation is believed to be unnecessary. However, since numerous modifications and changes will readily occur to those skilled in the art after a consideration of the foregoing specification and accompanying drawing, it is not desired to limit the invention to the exact construction shown and described, but all suitable modifications and equivalents may be resorted to, falling within the scope of the appended claims.

What is claimed is:

1. In a flush tank having a lower outlet formed with a valve seat and an overflow pipe, a horizontal arm projecting from said pipe, tubular guide sleeves carried by the outer end of said arm coaxial with said valve seat, a helical wire cage concentric to said valve seat, a small diameter ring of said helical wire cage and integral with the upper end of said cage and disposed concentric relative thereto, an upwardly projecting stem extending coaxially from said ring and engaging in said guide sleeves, said stem being lengthwise split at the upper end thereof, the split end of said stem being bent laterally in opposite directions to hold said stem against downward movement, a spherical valve plug loosely disposed in said cage, and a flexible member secured at one end to said valve plug and adapted for attachment at the opposite end thereof to a lift lever, said flexible member projecting upwardly through the space between said annulus and the upper end of said cage.

2. In a flush valve, a tubular fitting through which water is adapted to flow, a valve seat on the fitting, a valve adapted to engage the seat, an upright overflow pipe connected to the fitting, a guide arm attached to the overflow pipe and extending over above the tubular fitting, the guide arm having a bifurcation at one end provided with aligned openings, a guide member comprised of a single length spiral coil of wire having coils of substantially equal size for the major portion thereof and a coil of smaller size at its upper portion terminating in a straight stem portion extending through said aligned openings of said bifurcation for supporting said guide member, said stem portion having a split end the legs of which flare outwardly from each other to secure said guide to said guide arm and whereby said guide is suspendingly supported over said valve, and a flexible chain secured to said valve for pulling the latter from its seat, extending through the larger portion of said guide, said coil of smaller size acting as an upper limit or stop for said valve when the latter is pulled from its seat by means of said chain.

References Cited in the file of this patent

UNITED STATES PATENTS

| | | |
|---|---|---|
| 1,120,836 | Merewether | Dec. 15, 1914 |
| 1,272,091 | Quinn | July 9, 1918 |
| 2,121,362 | Marten | June 21, 1938 |
| 2,328,701 | Woodrum | Sept. 7, 1943 |